No. 862,294. PATENTED AUG. 6, 1907.
A. SWASEY.
RANGE FINDER.
APPLICATION FILED DEC. 11, 1906.
7 SHEETS—SHEET 1.
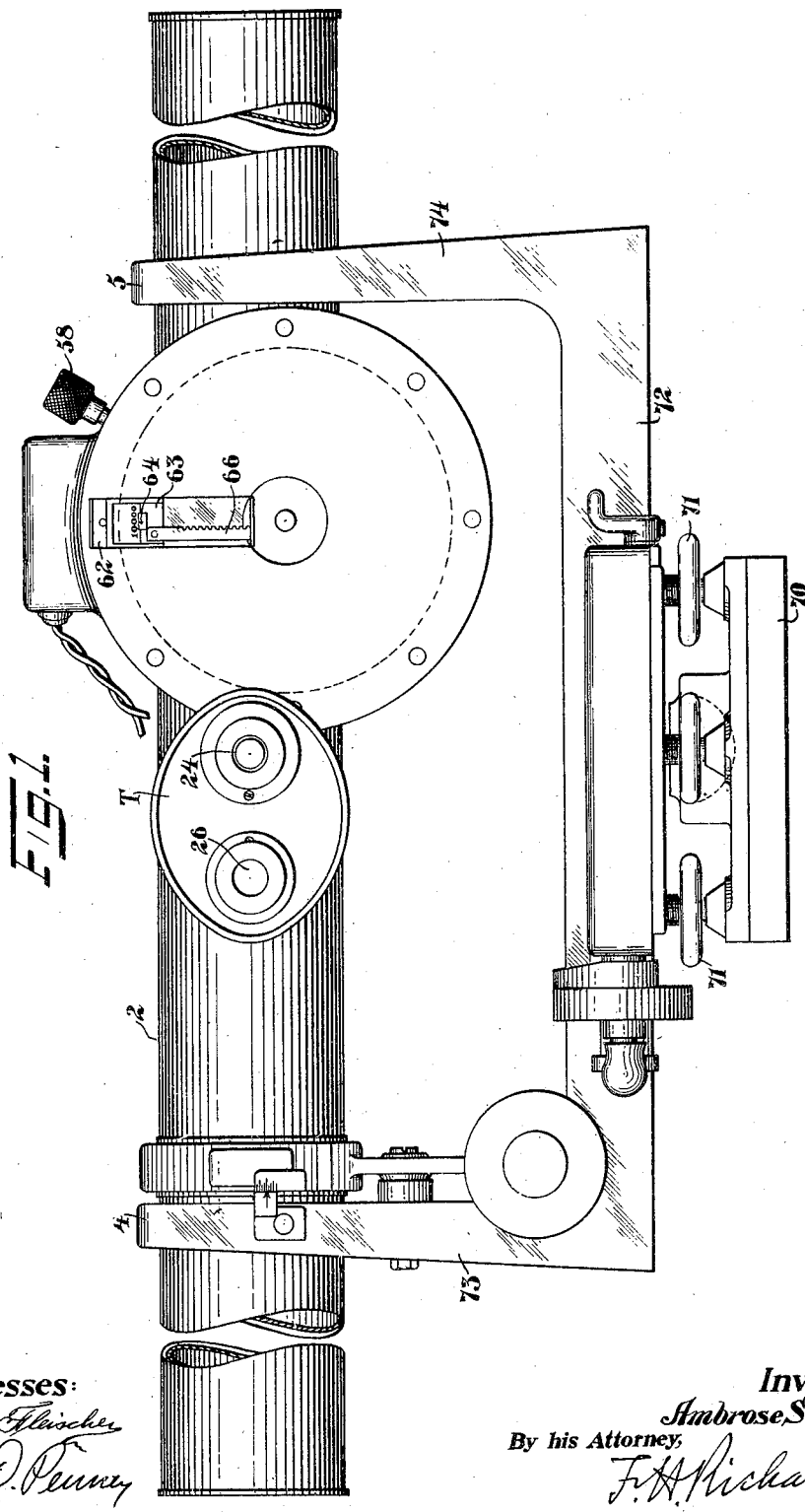
Witnesses:
Harry Fleischer
H. D. Penny
Inventor:
Ambrose Swasey.
By his Attorney,
F. H. Richards.

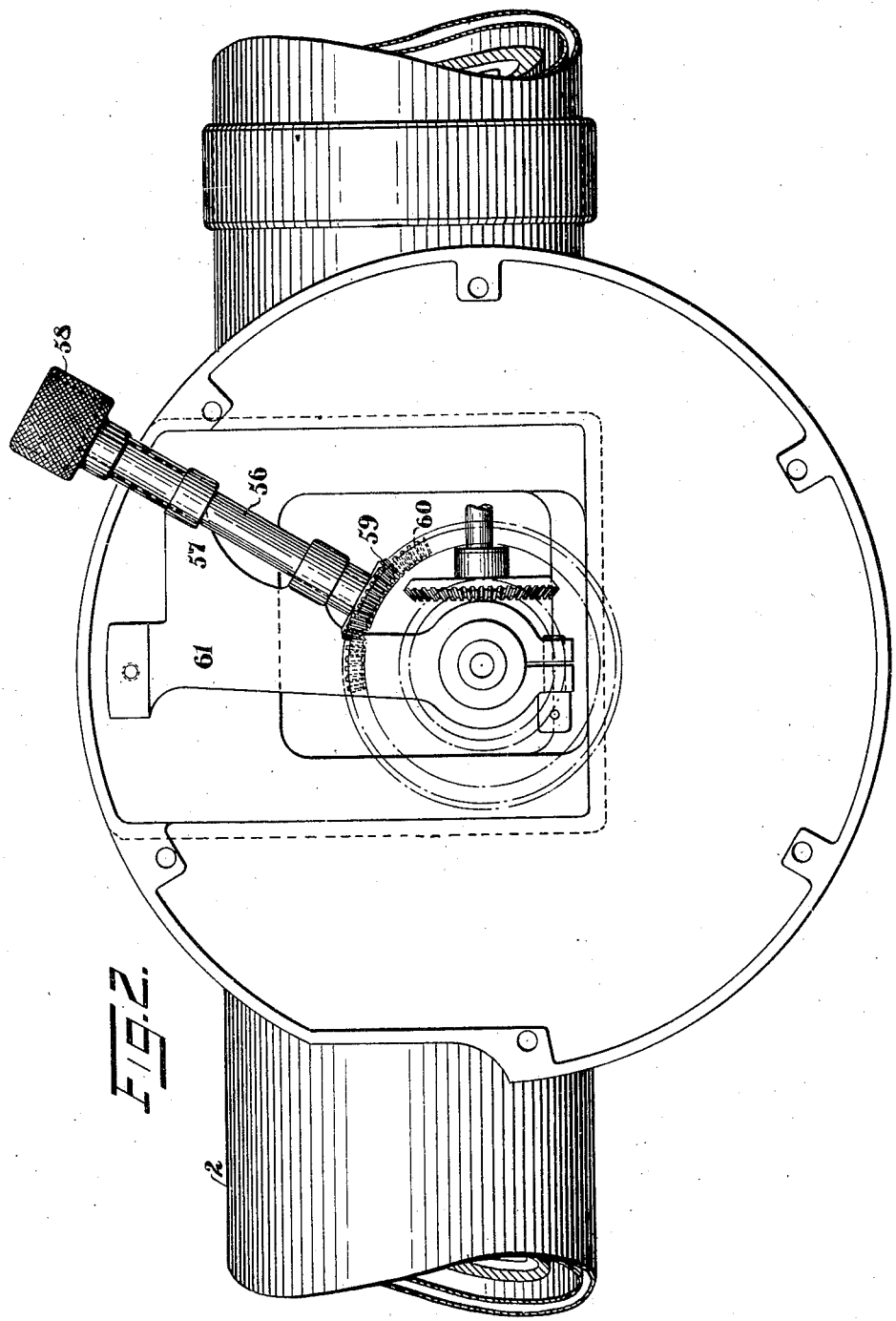

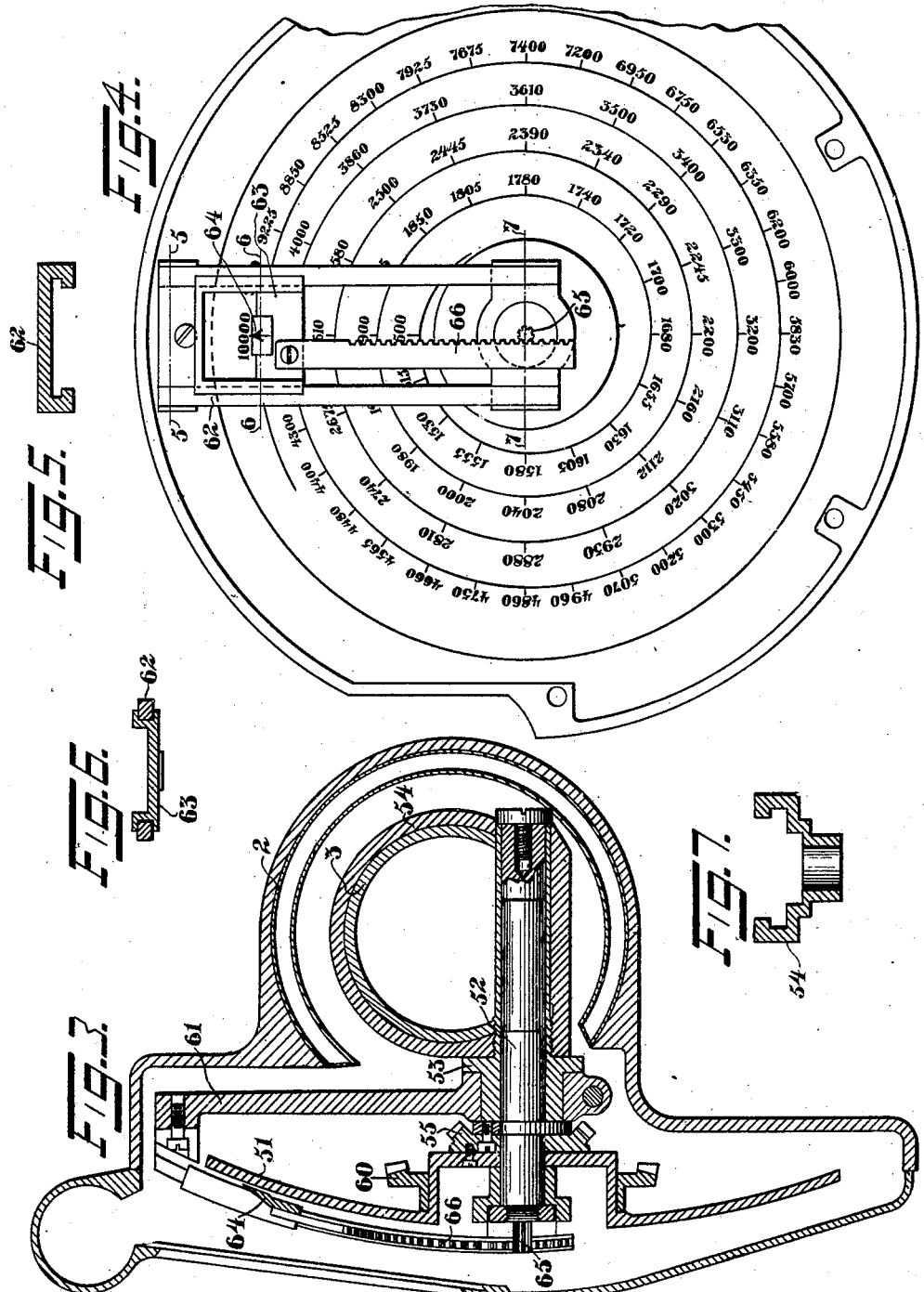

No. 862,294. PATENTED AUG. 6, 1907.
A. SWASEY.
RANGE FINDER.
APPLICATION FILED DEC. 11, 1906.
7 SHEETS—SHEET 4.
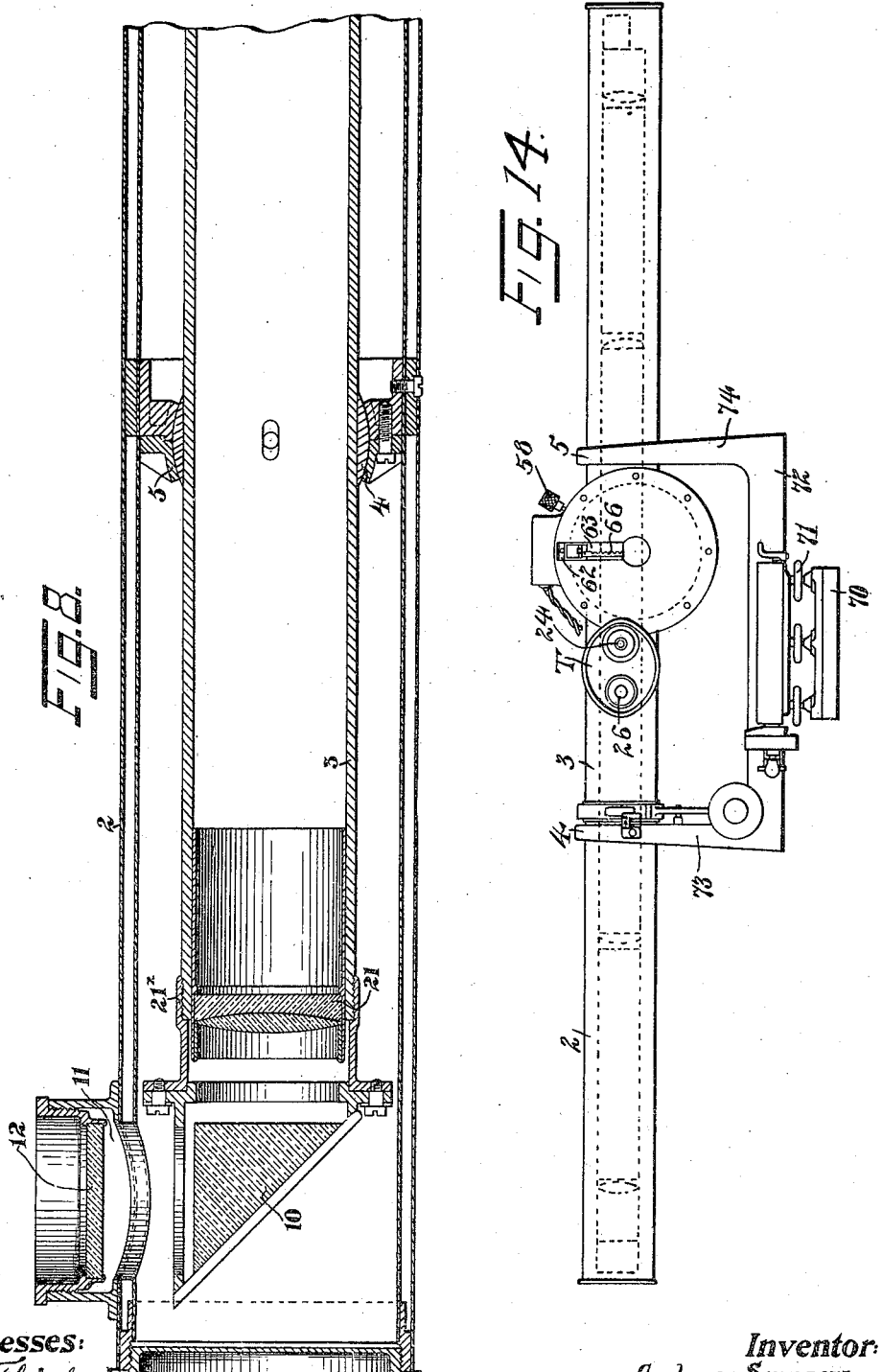
Witnesses:
Inventor:
Ambrose Swasey.
By his Attorney,

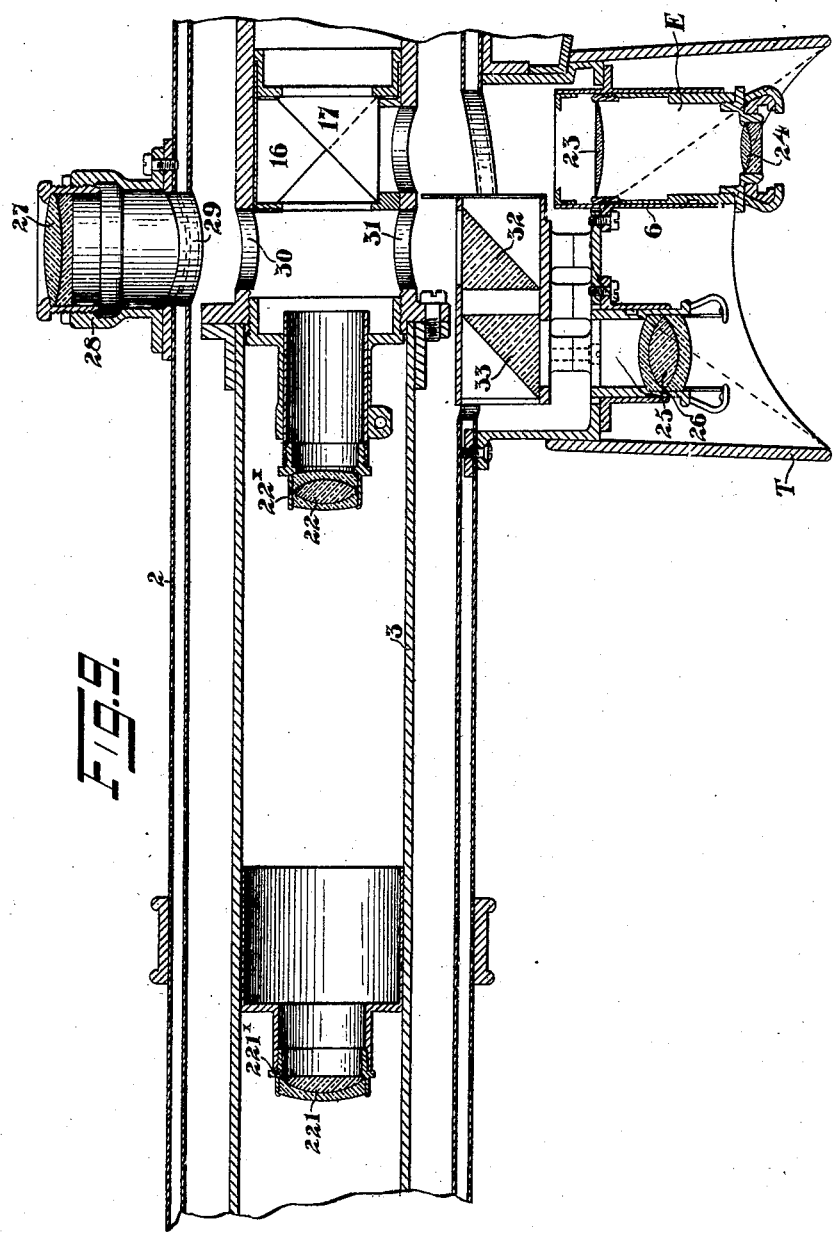

No. 862,294.
PATENTED AUG. 6, 1907.
A. SWASEY.
RANGE FINDER.
APPLICATION FILED DEC. 11, 1906.
7 SHEETS—SHEET 6.
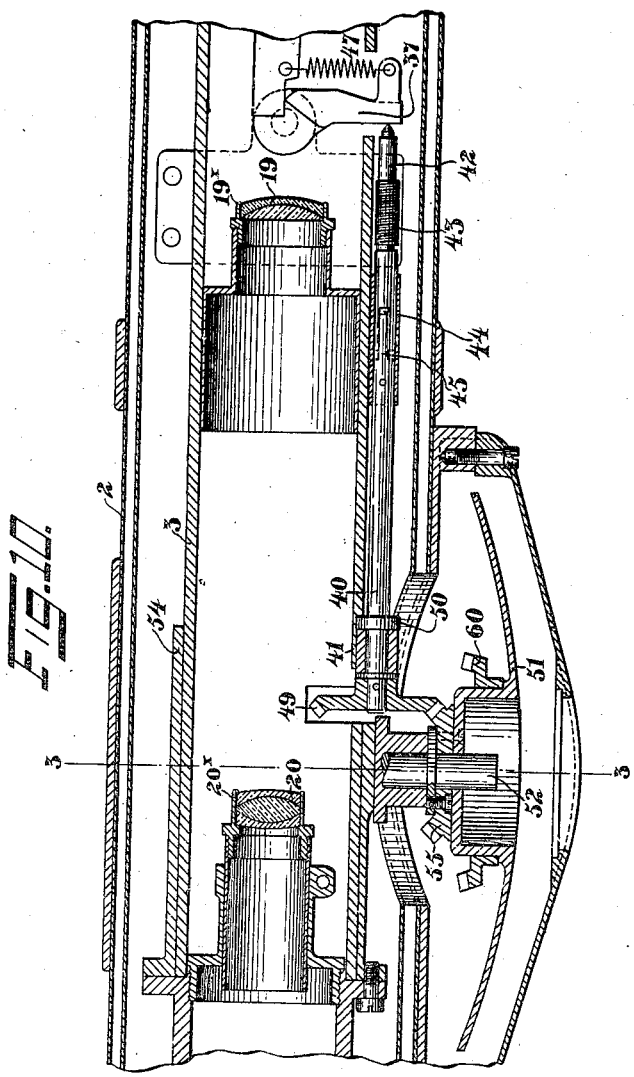
Witnesses:
Inventor:
Ambrose Swasey.
By his Attorney, No. 862,294.
PATENTED AUG. 6, 1907.
A. SWASEY.
RANGE FINDER.
APPLICATION FILED DEC. 11, 1906.
7 SHEETS—SHEET 7.
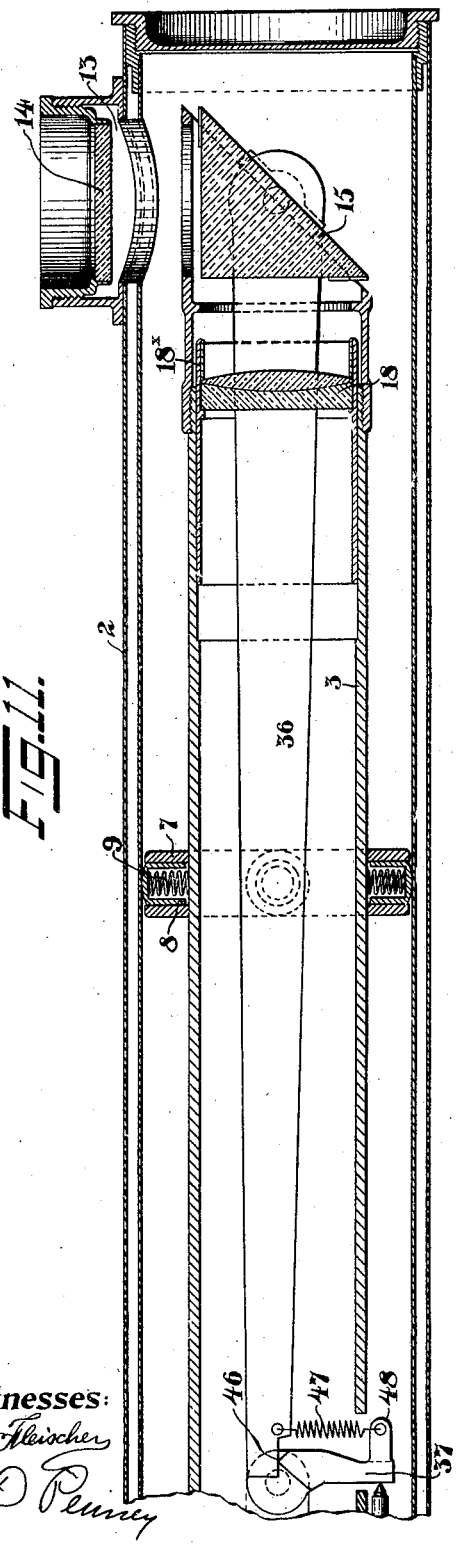
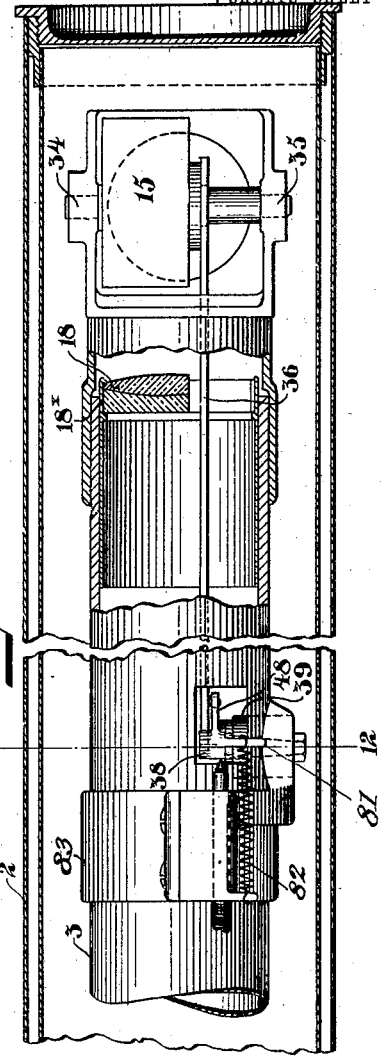
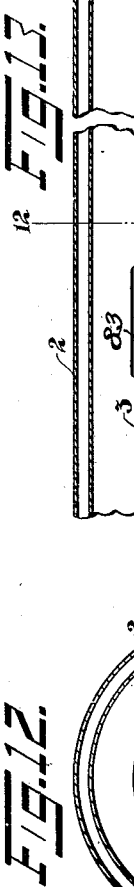
Witnesses:
Inventor:
Ambrose Swasey.
By his Attorney,

UNITED STATES PATENT OFFICE.

AMBROSE SWASEY, OF CLEVELAND, OHIO, ASSIGNOR TO THE WARNER & SWASEY COMPANY, OF CLEVELAND, OHIO, A CORPORATION OF OHIO.

RANGE-FINDER.

No. 862,294.      Specification of Letters Patent.      Patented Aug. 6, 1907.

Application filed December 11, 1906. Serial No. 347,346.

*To all whom it may concern:*

Be it known that I, AMBROSE SWASEY, a citizen of the United States, residing in Cleveland, in the county of Cuyahoga and State of Ohio, have invented certain new and useful Improvements in Range-Finders, of which the following is a specification.

This invention relates to distance instruments or range finders of the character in which the range is determined by sighting the object from two opposite and remote points on the instrument, the relation of the angles formed by sighting the object from these two ends with a base line connecting these ends, being used for giving the range.

One of the objects of the invention is to provide an improved means for supporting and operating the various movable parts for sighting the object from one end at different angles relative to the other end and to the base line.

Another object of the invention is to provide an inner tube supporting some of the optical elements and movable parts for adjusting them, and an outer tube in which the inner tube is movably supported, whereby flexure of the outer tube, either laterally or longitudinally, will not distort or change the shape of the inner tube.

In the accompanying drawings representing an instrument embodying my invention, Figure 1 is a front elevation of the instrument. Fig. 2 shows the indicator casing and operating means. Fig. 3 is a vertical section on the line 3—3 indicated in Fig. 10. Fig. 4 is a front view of the parts shown in Fig. 3 with the front plate removed. Fig. 5 is a section on the line 5—5 of Fig. 4. Fig. 6 is a section on the line 6—6 of Fig. 4. Fig. 7 is a section on line 7—7 of Fig. 4. Fig. 8 is a partial longitudinal section through the instrument at the end of the fixed prism. Fig. 9 is a horizontal longitudinal section at the intermediate part of the instrument adjacent that shown in Fig. 8. Fig. 10 is a horizontal longitudinal section at the intermediate part of the instrument adjacent that shown in Fig. 9. Fig. 11 is a horizontal longitudinal section through the instrument at the opposite end portion, and adjacent the section shown in Fig. 10. Fig. 12 is a vertical longitudinal section through the instrument on line 12—12 shown in Fig. 13. Fig. 13 is a partial longitudinal section at one end of the instrument, being shown partly in elevation. Fig. 14 is a front elevation.

The instrument comprises an outer tubular member 2 in which is supported an inner tubular member 3; and the optical elements (except the ocular) together with their supporting and operating mechanism are carried by the inner tube. Means are provided for permitting a slight relative movement between the two tubes, in order that change of shape of the outer tube, either laterally or longitudinally, will not distort the inner tube, and derange the optical system. These means are shown as comprising a kind of universal joint connection between the tubes adjacent one end portion, while adjacent the other end portion of the tubes is a yieldable connection, permitting relative longitudinal movements of the tubes at this end, as well as the radial movement on the universal joint in all directions. In the form illustrated, the inner tube 3 has a ring portion 4 whose outer surface is spherical, and is engaged by an internally spherical ring 5 carried by the outer tube. At the other end portion of the instrument, are provided a circular series of spring plungers carried by the inner tube, and pressed outward to engage the inner face of the outer tube. The spring plungers are carried in sockets 7, and the engagement of the plungers with the tube permits relative longitudinal movement of the two tubes. In each tube 7 slides a plunger 8 pressed outward by a coil spring 9 causing the end of the plunger to engage the outer tube.

At one end of the instrument, the inner tube carries a deflecting member shown in the form of a right angled prism 10. And an opening 11 is provided in the outer tube opposite the prism, which may be closed against dust and air by a glass plate 12. At the other end of the instrument is a similar construction comprising an opening 13 in the outer tube closed by a glass plate 14. A right angle prism 15 is carried in the inner tube opposite the opening 13, and these prisms 10 and 15 are practically in alinement at the axis of the inner tube, although a portion of the prism 15 is removed, since in these instruments the image of the object is divided into complemental portions which are respectively projected toward the intermediate reflectors by the prisms, that form the image in the ocular.

At the central portion of the instrument are arranged a pair of reflecting members, in the form shown as right angle prisms 16, and 17, being vertically superposed to receive the respective complemental portions of the images from the prisms 10 and 15, and project these portions of the image into the ocular, represented generally by E. The prism 10 is shown as fixed stationary in the inner tube; while the prism 15 is movable in order to sight it on the object that is sighted in the prism 10. Suitable lenses are interposed between the prisms 10 and 16 and the prisms 15, 17, to properly refract the rays. An objective lens 18 is mounted in the inner tube adjacent the prism 15 in the holder 18× and between this lens and the reflector 17 are mounted two lenses 19 and 20 carried by holders 19× and 20×. An objective 21 is mounted in the inner tube adjacent the prism 10 in the holder 21×, and between this objective and the prism 16 are mounted two lenses 22 and 221 in holders 22× and 221×. The ocular is shown as composed of two plano-convex lenses 23 and 24 mounted in a tube 6.

A finder is provided and arranged in the eye piece hood T, preferably adjacent the ocular E, so that one eye may be used for the finder and the other for the ocular of the sighting device. In the construction shown, the finder consists of an eye piece 25 provided with a double-convex lens 26. An objective plano-convex lens 27 is mounted in a tube 28, secured at an opening 29 in the outer tube 2, and openings 30 and 31 are provided in the inner tube in alinement with this objective. Two right angled prisms 32 and 33 are arranged to reflect the rays from the objective 27 into the eye-piece lens 26. By this construction, the objective of the finder is placed nearer the center of the instrument, than is the ocular of the finder.
A range indicator is provided adjacent the oculars, and operative members connect the indicator with the movable prism 15, whereby the movement of the prism to bring the images to coincide in the eye-piece, will correspondingly shift the indicator and cause it to read directly the range corresponding to the position of the prism 15. The prism 15 is mounted in the inner tube to swing on substantially vertical pivot portions 34 and 35, and is preferably arranged whereby the axis of the optical system will strike the reflecting surface at its central portion. Since this prism is used to reflect but one half of the image, it is shown with the lower portion removed and is little more than half of the prism required to reflect the whole image. The prism is swung on this axis by an arm 36 rigidly secured thereto, which arm operates in the lower portion of the inner tube 3, the upper half of the tube only being traversed by the complemental portion of the image. A lever 37 is pivotally mounted in the lower part of a clamping ring 83 secured on the tube 3 by a journal portion 38 swinging in the bearing 39 fast to the tube. A shaft 40 is rotatable in a bearing 41 fast to the outside of the tube 3. The shaft is provided with an extension member 42 that is externally threaded and operates in an internally threaded box 43 fast outside of the tube 3. The shaft portion 42 has a mortise 44 into which extends a tenon 45 on the end of the shaft 40. The rotation of shaft 40 will thereby cause an advancement of its extension 42. The end of the extension is somewhat pointed and engages the lever 37 when the shaft extension is advanced in that direction. Lever 37 has a knife-edge portion 46 engaging the end portion of the lever 36 and these two members are retained in contact by a coil spring 47 that is connected between the lever 36 and an arm 48 on lever 37, a lug 81 projects downward from the lever 37 as shown in Figs. 12 and 13, and a coil spring 82 is stretched between the lug 81 and the clamping ring 83 surrounding the inner tube 3 on which ring the lever 37 is pivotally supported. The tension of this spring serves to retain the lever 37 in engagement with the shaft extension 42. On one end of the shaft 40 is secured a bevel gear 49. The shaft also carries a collar 50, which collar and the gear 49 engage opposite portions of the bearing member 41 and prevent endwise movement of the shaft 40.

The indicating member in this instance is in the form of a somewhat conical disk 51 secured on a shaft 52, rotatable in a bearing 53, that is secured to a sleeve 54, surrounding the inner tube 3. A bevel gear 55 is secured to the sleeve of the disk 51 and engages the bevel gear 49 fast on shaft 40, by which means the indicator disk and movable prism 15 are operably connected.

Means for operating this mechanism from the outside of the instrument are provided, and shown as comprising a shaft 56 mounted in bearings 57. The shaft has an operating head 58 on its outer end, while its inner end carries a bevel gear 59 meshing with a bevel gear 60 fast on the hub of the disk 51. The indicator disk is provided with suitable graduations in a spiral form, as indicated in Fig. 4, and a pointer is movably mounted to advance the distance between the spiral indications at each revolution of the disk. An arm 61 secured to the bearing for the shaft 52, extends beyond the disk 51 and carries a guide plate or form 62. A slide 63 carrying a pointer 64 moves on this slide with the pointer in close proximity to the disk. At the outer end of shaft 52 is a gear 65 that meshes with a rack 66 secured to the slide 63 by which means the rotation of the shaft 52 causes the pointer 64 to travel across the disk and follow the spiral line of graduations. It will thus be seen that by manipulating the head 58 of the operating shaft 56, the indicator disk will be rotated, and at the same time the prism 15 will be swung on its axis. At the same time, the operator sights through the ocular E. This operation is continued until the two images coincide in the ocular. The graduation adjacent the pointer will then indicate the range directly.

In Fig. 1 the means of supporting the instrument are shown as comprising a base 70 carrying leveling screws 71, that serve to level the supporting member 72. Two uprights 73 and 74 are mounted on the support 72, and engage the outer tube 3 in bearing portions 4 and 5 respectively.

Having thus described my invention, I claim:

1. In a range finder, the combination of a tubular support, an eye-piece carried thereby at its middle portion, reflecting prisms at the end portions of the support, reflecting members at the middle portion of the support arranged to receive complemental portions of the images of an object sighted by the prisms and project these images into the eye-piece, one of the end reflecting prisms being pivotally mounted on an axis adjacent its reflecting surface, a lever secured to said prism and extending through the tube adjacent one side thereof, an indicating device, a shaft rotatably mounted on the tube, gears rotatably connecting the indicator with the said shaft, a shaft extension externally screw-threaded, a threaded bearing in which said shaft is rotatable to cause endwise movement, and said shaft and shaft extension having a tenon-and-mortise connection causing the simultaneous rotation thereof permitting endwise advancement, a lever arranged to engage the prism lever, said latter lever being also engaged by the shaft extension to rock both said levers upon endwise movement of the shaft extension.

2. In a range finder, the combination of an inner tube, an eye-piece, reflecting prisms at the end portions of the tube, reflecting members at the middle portion of the tube arranged to receive complemental portions of the images of an object sighted by the prisms and project these images into the eye-piece, an outer tube, one of the end reflecting prisms being pivotally mounted on an axis adjacent its reflecting surface, a lever secured to said prism and extending through the inner tube adjacent one side thereof, an indicating device, a shaft rotatably mounted on the inner tube, gears rotatably connecting the indicator with said shaft, a shaft extension externally screw-threaded, a threaded bearing in which said shaft is rotatable to cause endwise movement, said shaft and shaft extension having a tenon-and-mortise connection causing the simultaneous rotation thereof permitting endwise advancement, a lever arranged to engage the prism lever, the latter lever being also engaged by the shaft extension to rock both said levers upon endwise movement of the shaft extension.

3. In a range finder, the combination of a tubular support, an eye-piece carried thereby at its middle portion, reflecting prisms at the end portions of the tube, reflecting members at the middle portion of the tube arranged to receive complemental portions of the images of an object sighted by the end reflectors and project these images into the eye-piece, one of the end reflecting prisms being pivotally mounted on an axis adjacent its reflecting surface, a lever secured to said prism and extending through the tube adjacent the side thereof, a rotatable shaft, an indicating device on said shaft, operative connections between said indicating device and said lever, a guide member adjacent the indicator, a slide movable in the guide member radially across the face of the indicator, a gear on the shaft of the indicator, and a rack on said slide engaging said gear to be traversed thereby to follow a spiral path on the indicator.

4. In a range finder, the combination of an inner tube, an eye-piece, reflecting prisms at the end portions of the tube, reflecting members at the middle portion of the tube arranged to receive complemental portions of the images of an object sighted by the prisms and project these images into the eye-piece, an outer tube, one of the end reflecting prisms being pivotally mounted on an axis adjacent its reflecting surface, a lever secured to said prism and extending through the inner tube adjacent one side thereof, a rotatable shaft, an indicating device on said shaft, operative connections between said indicating device and said lever, a guide member adjacent the indicator, a slide movable in the guide member across the face of the indicator, a gear on the shaft of the indicator, and a rack on said slide engaging said gear and traversed thereby to follow a spiral path on the indicator.

AMBROSE SWASEY.

Witnesses:
  A. C. COOK,
  F. H. RICE.